Sept. 16, 1930.  G. W. EMRICK  1,775,994
DRILL CHUCK
Filed July 11, 1929
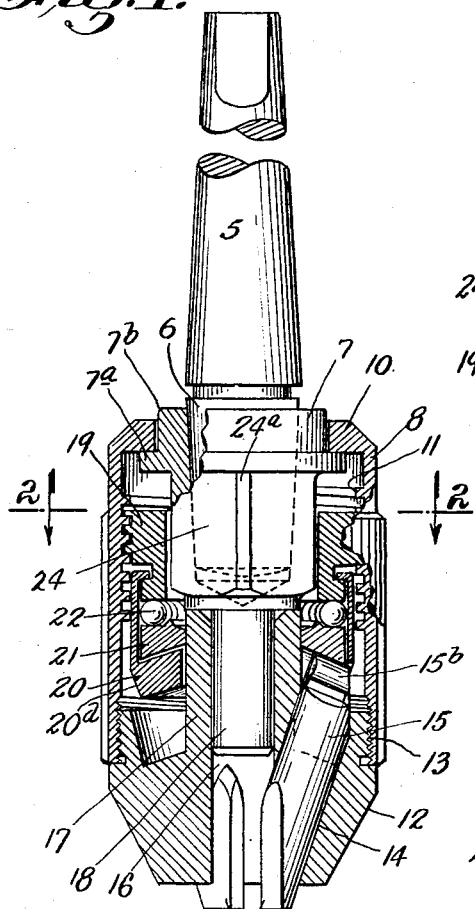
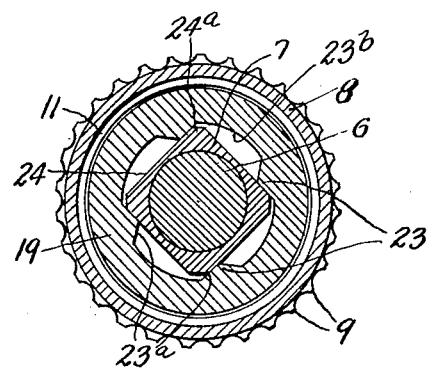
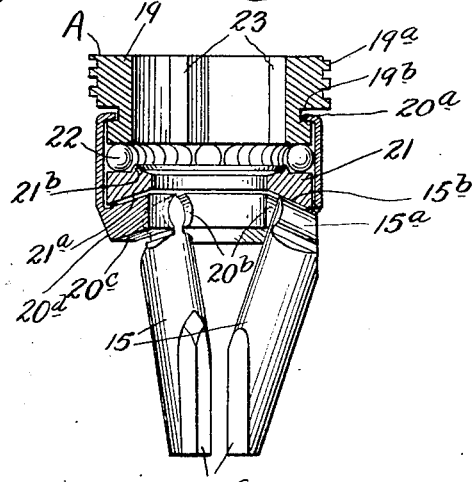
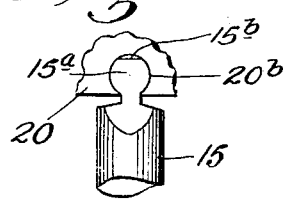
INVENTOR.
George W. Emrick
BY Howard C. Thompson
ATTORNEY Patented Sept. 16, 1930

1,775,994

UNITED STATES PATENT OFFICE

GEORGE W. EMRICK, OF BROOKLYN, NEW YORK, ASSIGNOR TO ETTCO TOOL CO. INC., OF BROOKLYN, NEW YORK, A CORPORATION OF NEW YORK

DRILL CHUCK

Application filed July 11, 1929. Serial No. 377,399.

This invention relates to drill chucks and particularly to devices of this class having means for firmly engaging a drill or other tool and for quickly releasing such tool whenever desired, and particularly to chuck devices such as disclosed in my prior application, bearing Serial Number 357,648, filed April 24, 1929, and the principal object of my invention is to provide a jaw supporting and operating unit for chuck devices of the class specified, which by virtue of its construction and assemblage of parts may be inserted and removed from the casing of the chuck as a unit, facilitating the replacement thereof whenever necessary or desirable; a further object being to provide a unit of the class specified involving a collar in free screw threaded engagement with the casing of the device, a sleeve permanently coupled with said collar and with which the collar is freely rotatable as well as readily movable, and a thrust ring disposed within the sleeve and upon which the inner or upper ends of the jaws supported in connection with the sleeve are adapted to operate in taking up the thrust as well as the arrangement of a plurality of bearing balls between the opposed surfaces of the ring and said collar with means for preventing the displacement of said balls; a still further object being to provide a unit of the class specified wherein the thrust ring is provided with an angular bearing face arranged at right angles to the longitudinal plane of the jaws to prevent excessive friction and binding of the jaws in connection with said unit, the upper ends of the jaws having flat surfaces adapted to engage the beveled surface of said ring; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal, sectional view through a chuck made according to my invention.

Fig. 2 is a transverse sectional view on the line 2—2 of Fig. 1.

Fig. 3 is a sectional, detail view of the jaw supporting and operating unit, detached; and, Fig. 4 is a side view of a part of the construction shown in Figs. 1 and 3.

In Fig. 1 of the drawing, I have shown at 5 a spindle of the usual or conventional form in connection with which my improved chuck is mounted. The spindle has a tapered end portion 6 which is adapted to be coupled with a spindle receiving part 7 arranged within the casing 8 of the chuck. The casing 8 is tubular in form, the outer wall being preferably provided with longitudinal ribs 9 to facilitate the rotation of said casing by hand, the upper end of the casing being closed by a cover or ring 10 in which the part 7 is rotatably mounted.

The bore of the casing 8 has at its upper end portion an internal square screw thread 11; and a jaw guiding part 12 is in screw threaded engagement with the lower end of said casing as seen at 13, the part 12 having in the construction shown, three angularly disposed bores or apertures 14 which open through the lower end of said part and into the casing 8 at the upper end thereof and in which jaws 15 are mounted to move longitudinally of said bores.

The part 12 includes a central bore or aperture 16 which limits the size of the drill shank insertable into the chuck, it being understood at this time that the chuck may be made in different sizes. The part 12 terminates at its upper end in a bearing sleeve 17 in which a stub shaft or trunnion 18 at the lower end of the part 7 is arranged to aline the part 7 with respect to the part 12, and thus centralize the tool with respect to the axis of the spindle 5. It will be noted in this connection, that the part 7 includes a flange 7ª arranged inwardly of the cap or end wall 10 to retain said part against displacement from the casing 8, sufficient clearance being allowed between the flange and the mechanisms within the chuck casing to provide for slight longitudinal movement of the casing with respect to the part 7. This is true of the bearing surfaces between the colar 7ᵇ of the part 7 and the cap or end wall 10.

Arranged within the casing 8 is a jaw supporting and operating unit A comprising a collar 19, a sleeve 20, a thrust ring 21, and bearing balls 22 disposed between the ring and said collar within said sleeve. This unit is shown detached in Fig. 3 of the drawing.

The collar 19 has an external screw thread 19ᵃ which meshes loosely with the internal screw thread 11 of the casing 8, said collar having an annular groove 19ᵇ adjacent its lower end to receive an inturned flange 20ᵃ on the upper end of the sleeve 20 so as to permanently couple the several parts of the unit A together, it being noted that movement is provided between the collar and sleeve both longitudinally and radially to eliminate any possible binding between said parts. It will also be seen that sufficient clearance is allowed between the ring 21 and sleeve 20 to permit radial and longitudinal movement of the sleeve with respect to said ring. The sleeve 20 has a plurality of upwardly inclined and radially extending recesses 20ᵇ which are substantially cylindrical in cross sectional form and open outwardly through the lower surface of the sleeve, and in which the substantially cylindrical heads 15ᵃ of the jaws 15 are mounted to permit the movement of said jaws radially with respect to said sleeve in the operation of the chuck. The upper surfaces of the cylindrical heads of the jaws are flat as seen at 15ᵇ so as to bear upon the lower beveled surface 21ᵃ of the ring 21, the inclination of the beveled surface 21 being such as to extend at right angles to the longitudinal plane of the jaws, so that the flat surfaces 15ᵇ thereof will rest snugly upon the beveled surface 21ᵃ of said ring as clearly seen in Figs. 1 and 3 of the drawing.

The upper surface of the ring 21 adjacent the inner diameter thereof is provided with an upwardly extending flange 21ᵇ which serves to retain the balls 22 against displacement and yet permit the radial movement of said balls with respect to said ring and the collar 19. The lower surface 20ᶜ of the sleeve 20 is beveled to correspond with the inclination of the recesses 20ᵇ or the beveled face 21ᵃ of the ring 21, and the lower outer corners are also beveled as seen at 20ᵈ to provide the necessary clearance permitting the complete upward and downward movement of the unit within the parts of the casing of the chuck as will be apparent.

The bore of the collar 19 is of the cross sectional form clearly seen in Fig. 2 of the drawing and is provided with oppositely disposed inwardly extending shoulders 23 having beveled side walls 23ᵃ. The part 7 where it operates in the collar 19 or between the flange 7ᵃ and trunnion 18 is square in cross sectional form as seen at 24, Fig. 2 of the drawing. The corner portions 24ᵃ formed by this square cross sectional form are adapted to freely pass within the recesses 23ᵇ formed between the shoulders 23 and to strike up against the beveled surfaces 23ᵃ of each of said shoulders to form the clutch engagement of the part 7 with respect to the collar 19 in the operation of moving the jaws 15 into firm engagement with a tool. In like manner, this construction will permit the quick and free release of the tool by a sudden blow imparted to the peripheral wall of the casing in a direction which will advance the sleeve upwardly in said casing.

The movement of the corners 24ᵃ from the locked position to the releasing position constitutes a hammer blow upon the collar 19 by virtue of the free travel of said corner portions from one of the beveled faces of the shoulders 23 to the other beveled faces thereof.

In the above described operation, it will be understood that the unit A and especially the collar 19 thereof is free to travel upwardly and downwardly upon the square shank portions 24 of the part 7. It will also be understood that in the several movements of the unit, the parts thereof are capable of free relative movement by virtue of the clearance provided between said respective parts as well as in conjunction with the casing of the device. As the unit is moved upwardly and downwardly in the chuck casing, the jaws 15 are moved upwardly and downwardly in the bores 14 so as to separate and bring together the beveled gripping faces 15ᶜ thereof.

It will also be understood that while I have shown my improved unit as arranged in a casing of specific construction and have illustrated certain structural characteristics to the several parts of the unit, that my invention is not necessarily limited to the specific structural details herein shown and described and various changes therein and modifications thereof may be made within the scope of the appended claims without departing from the spirit of my invention or sacrificing its advantages.

Having fully described my invention, what I claim as new and desire to secure by Letters Patent, is:

1. In a chuck of the class described, a casing, a jaw supporting and operating unit arranged in the casing and comprising a collar in screw threaded engagement with the casing to feed said unit longitudinally with respect to the axis of the chuck, a jaw supporting sleeve permanently attached to said collar and with which the collar is capable of free, rotary, radial and longitudinal movement, said sleeve having radial recesses opening through the upper surface thereof, jaws having heads slidably mounted in said recesses and exposed through the upper surface of said sleeve, and a thrust ring arranged between opposed walls of the collar and sleeve and upon which the head ends of said jaws are adapted to bear.

2. In a chuck of the class described, a casing, a jaw supporting and operating unit arranged in the casing and comprising a collar in screw threaded engagement with the casing to feed said unit longitudinally with respect to the axis of the chuck, a jaw supporting sleeve permanently attached to said collar and with which the collar is capable of free, rotary, radial and longitudinal movement, said sleeve having radial recesses opening through the upper surface thereof, jaws having heads slidably mounted in said recesses and exposed through the upper surface of said sleeve, a thrust ring arranged between opposed walls of the collar and sleeve and upon which the head ends of said jaws are adapted to bear, the heads of said jaws being arranged angularly in said sleeve and the lower surface of said ring being beveled to dispose said surface in parallelism with the upper surfaces of said jaws, bearing balls disposed between said ring and collar, and means including said sleeve for retaining said balls against displacement and permitting free radial movement thereof with respect to said ring and collar.

3. In a chuck device of the class described, a jaw supporting and operating unit comprising a collar, a sleeve and a ring, said collar being in screw threaded engagement with the chuck device, said sleeve being permanently attached to the collar and movable radially and longitudinally with respect thereto and to said ring, a plurality of bearing balls disposed between the ring and collar, means on the sleeve and ring to retain said balls against displacement and permitting free radial movement thereof, said sleeve having a plurality of circumferentially spaced radially inclined apertures opening through the upper face of the sleeve, and jaws having heads arranged to move longitudinally of the apertures of said sleeve and radially with respect to the axis of the chuck and the upper surfaces of said heads cooperating with said ring.

4. In a chuck of the class described, a casing, a jaw supporting and operating unit arranged in the casing and comprising a collar in screw threaded engagement with the casing to feed said unit longitudinally with respect to the axis of the chuck, a jaw supporting sleeve permanently attached to said collar and with which the collar is capable of free, rotary, radial and longitudinal movement, said sleeve having radial recesses opening through the upper surface thereof, jaws having heads slidably mounted in said recesses and exposed through the upper surface of said sleeve, a thrust ring arranged between opposed walls of the collar and sleeve and upon which the head ends of said jaws are adapted to bear, the heads of said jaws being arranged angularly in said sleeve and the lower surface of said ring being beveled to dispose said surface in parallelism with the upper surfaces of said jaws and at right angles to the longitudinal axis of said jaws whereby said surfaces maintain a parallel and abutting relation in several positions of the jaws and in the thrust of said jaws on said ring.

5. In a chuck device of the class described, a jaw supporting and operating unit comprising a collar, a sleeve and a ring, said collar being in screw threaded engagement with the chuck device, said sleeve being permanently attached to the collar and movable radially and longitudinally with respect thereto and to said ring, a plurality of bearing balls disposed between the ring and collar, means on the sleeve and ring to retain said balls against displacement and permitting free radial movement thereof, said sleeve having a plurality of circumferentially spaced, radially inclined apertures opening through the upper face of the sleeve, and jaws having heads arranged to move longitudinally of the apertures of said sleeve and radially with respect to the axis of the chuck, the upper surfaces of said heads cooperating with said ring, and the surface of said ring engaging said heads being arranged in parallel relation to said heads, and at right angles to the axis of said jaws whereby the surfaces of said ring and heads are maintained in parallel and abutting relation in the several positions of said jaws.

In testimony that I claim the foregoing as my invention I have signed my name this 2nd day of July, 1929.

GEORGE W. EMRICK.